United States Patent [19]
Hickey

[11] 3,709,314
[45] Jan. 9, 1973

[54] ALL TERRAIN VEHICLE
[75] Inventor: Victor F. Hickey, Ventura, Calif.
[73] Assignee: FMC Corporation, San Jose, Calif.
[22] Filed: Oct. 16, 1970
[21] Appl. No.: 81,236

[52] U.S. Cl. ................................180/44 R, 180/73 D
[51] Int. Cl. .............................................B60k 17/34
[58] Field of Search ....180/44 R, 42, 73; 280/96.2 R, 280/112 A

[56] References Cited

UNITED STATES PATENTS

| | | | |
|---|---|---|---|
| 1,780,370 | 11/1930 | Tenney | 180/44 R X |
| 2,092,612 | 9/1937 | Olley | 280/96.2 R X |
| 2,631,681 | 3/1953 | Utz et al. | 180/44 R |
| 2,978,255 | 4/1961 | Rosenkrands | 280/112 A |
| 3,235,021 | 2/1966 | Hill | 180/44 R |
| 3,246,717 | 4/1966 | Dreisziger | 180/73 R |
| 3,277,975 | 10/1966 | Van Winsen | 180/73 R |
| 3,379,269 | 4/1968 | Zetye | 180/73 R |
| 3,390,593 | 7/1968 | Brownyer | 180/44 R X |
| 3,407,893 | 10/1968 | Hill et al. | 180/44 R |
| 3,451,497 | 6/1969 | Barnes et al. | 180/73 |
| 3,105,699 | 10/1963 | Peras | 280/96.2 R |

OTHER PUBLICATIONS

Publication: "Suspensions from the Ground Up" By Charles M. Rubly, S.A.E. Publication, March 15–17, 1960, 143D pages 4–7.
"Hot Rod" Magazine, issue of Nov. 1968, pages 104–105.
Publication: "Suspensions from the Ground Up" by Charles M. Rubly, Soc. Auto. Eng. Publication, March 15–17, 1960, 143D, pages 4 to 7.

*Primary Examiner*—Kenneth H. Betts
*Attorney*—F. W. Anderson and C. E. Tripp

[57] ABSTRACT

A high speed all terrain vehicle of the type having four wheel drive through a limited slip inter-axle differential that is effective to transfer driving torque between a front differential and a rear limited slip differential upon loss of traction of some of the wheels. Improved rough terrain mobility is achieved through an independent torsion bar suspension employing a power augmented roll steer characteristic to reduce the turning radius of the vehicle.

1 Claim, 7 Drawing Figures

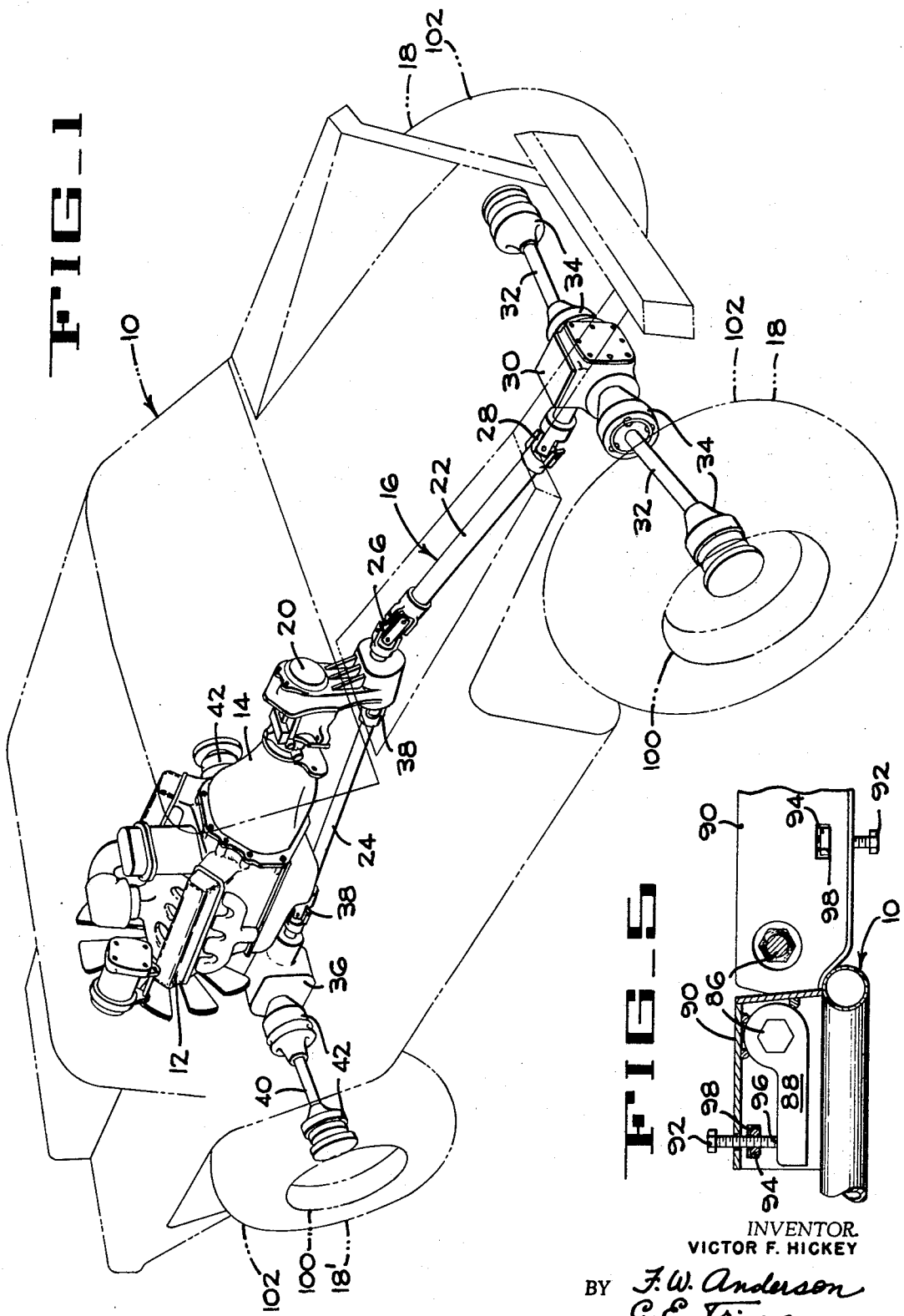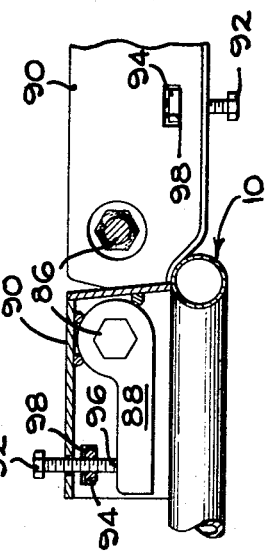

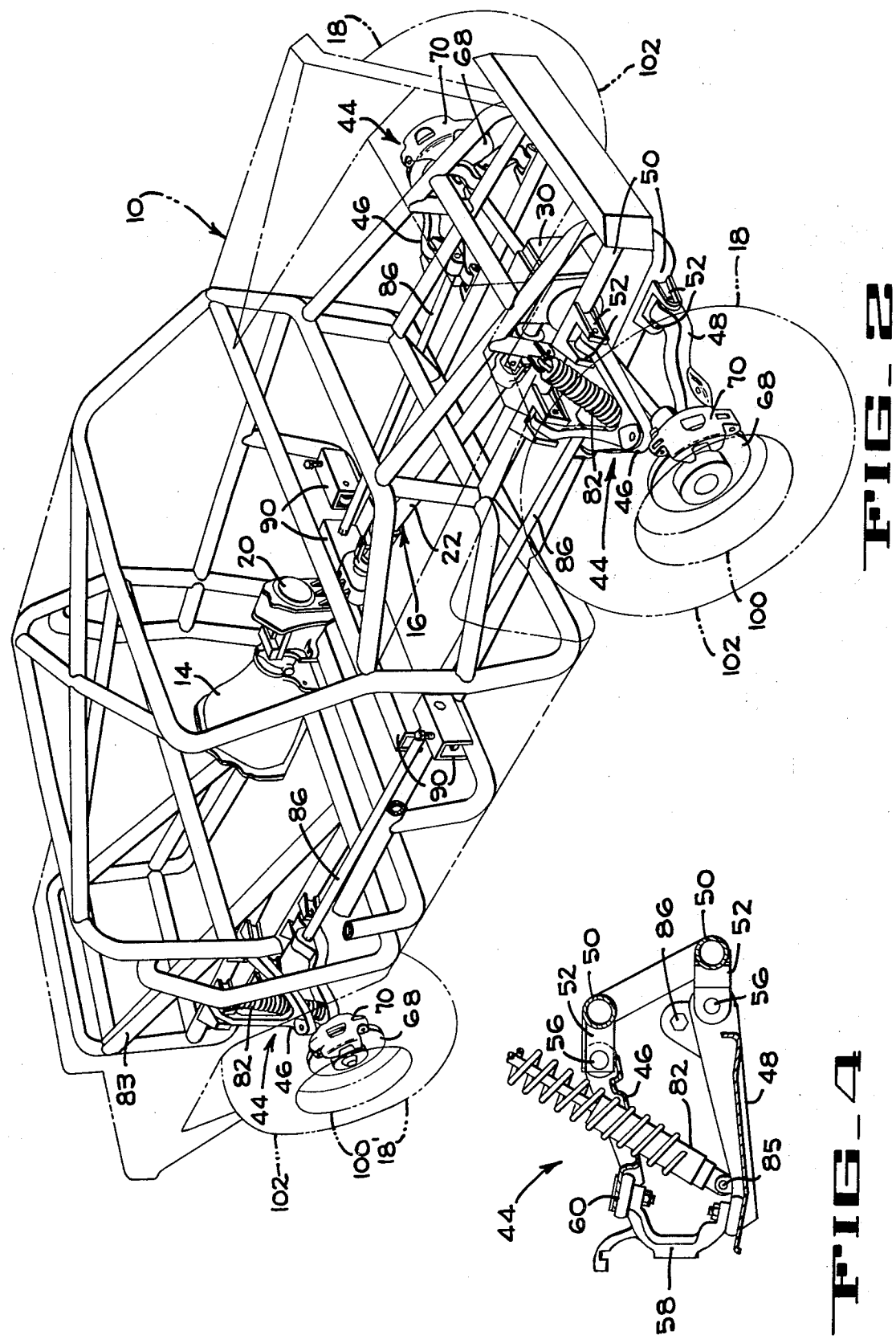

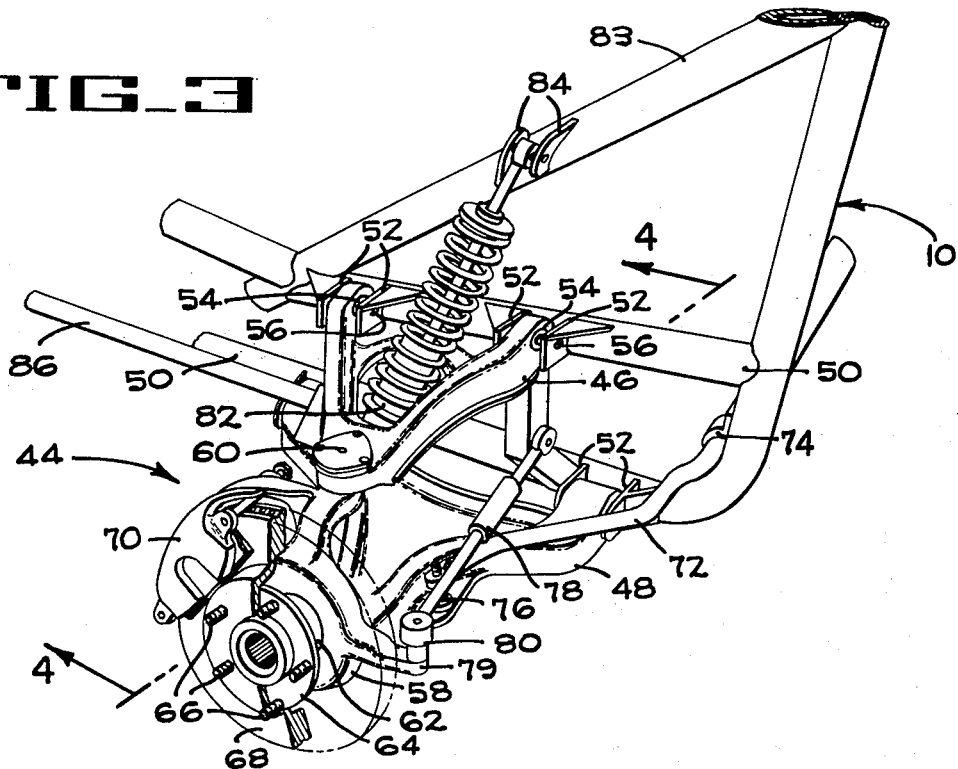
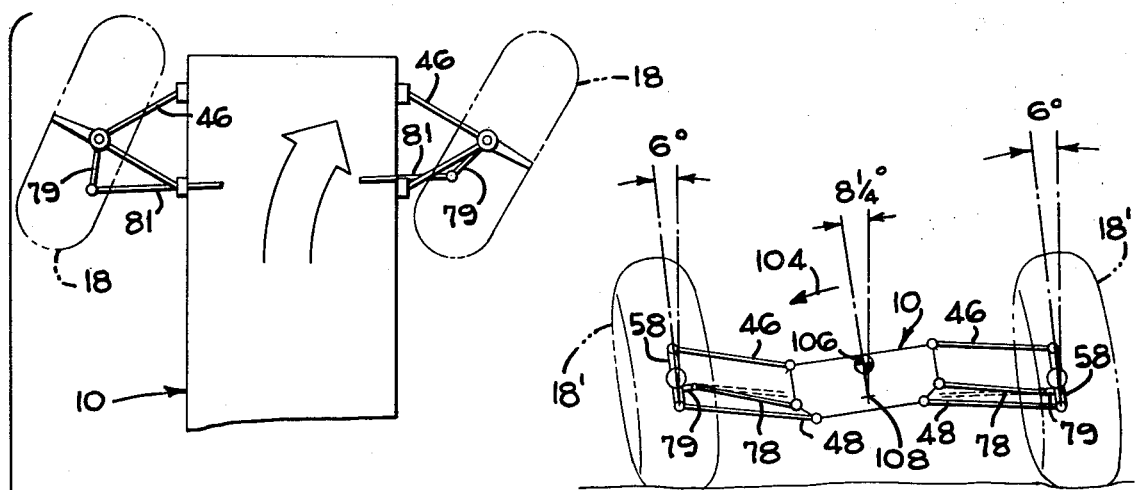
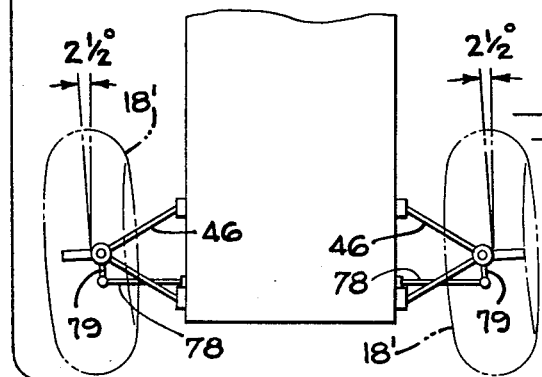

ALL TERRAIN VEHICLE

BACKGROUND OF THE INVENTION

1. Field of the Invention

The present invention pertains to wheeled cross-country rough terrain vehicles and more particularly to such vehicles having four wheel drive, independent suspension with roll center steering and torsion bar springing.

2. Summary of the Invention

The purpose of the present invention is to provide a wheeled high speed, cross-country, rough terrain vehicle suitable for use as a reconnissance vehicle for use with highly mobile armored forces or for use as a family recreational vehicle. The presently known vehicles are not capable of operating with modern armored forces at sufficiently high speed and safety in rough terrain conditions.

The vehicle of the present invention achieves this higher mobility through a novel drive train that takes power from the transmission and divides it between a front differential and a rear limited slip differential by means of an interaxle differential that incorporates a limited slip features in both forward or reverse. This drive train supplies a four wheel drive to the vehicle in which motive power is available as long as either one of the rear wheels has traction.

Mobility is further improved by combining the four wheel drive train with a fully independent suspension employing adjustable torsion bar springing and coil springs over shock absorbers providing: a low profile and increased visibility over the front of the vehicle, a large wheel displacement for rough terrain, and a capability of adjusting the vehicle height for varying the ground clearance.

A further advantage resides in the employment of power augmented roll center steering at the rear wheel which permits higher speed turns at a decreased turn radius.

BRIEF DESCRIPTION OF THE DRAWINGS

FIG. 1 is a diagrammatic perspective view of the vehicle of the present invention showing the four wheel drive power train.

FIG. 2 is a view similar to FIG. 1 showing the vehicle frame and suspension.

FIG. 3 is an enlarged perspective view of the left rear wheel suspension.

FIG. 4 is a section taken on line 4—4 of FIG. 3.

FIG. 5 is an enlarged view of the torsion bar mounting and anchors.

FIG. 6 is a diagrammatic end view of the rear suspension.

FIG. 7 is a diagrammatic plan view of the vehicle showing the effect of roll center steering.

DESCRIPTION OF THE INVENTION

The all terrain vehicle of the present invention is shown in FIG. 1 where the body 10 of the vehicle is shown in phantom line. In order to drive the vehicle, an internal combustion engine 12 is coupled to an automatic transmission 14. From the transmission a drive train generally indicated at 16 transmits power to each of four wheels indicated at 18 in front and 18' in the rear.

Drive Train

Included in the drive train 16 is an interaxle differential 20 which divides the power from the transmission 14 to a front propeller shaft 22 and a rear propeller shaft 24. A conventional constant velocity double universal joint 26 such as the Hooke's type is employed to connect the propeller shaft 22 to the interaxle differential 20, while a single constant velocity universal joint 28 connects the propeller shaft to a front differential 30. This differential is of a well known type such as employed in a 1970 Corvette automobile and has an input-output ratio of 5:14 to 1:00. The construction of the differential 30, while not important to the present invention, is described in the 1970 Chassis Service Manual No. ST 130-70 pages 4-23 through 4-25 and FIG. 65 thereby published by the Chevrolet Motor Division, General Motors Corporation, Detroit, Michigan, United States of America.

From the front differential 30, the front wheels 18 are driven by drive shafts 32 that have single, constant velocity universal joints 34 of the Rzeppa or Bendix-Weiss type at each end.

In order to supply power to the rear wheels 18', the rear propeller shaft 24 is connected between a rear differential 36 and the interaxle differential 20 by means of single, constant velocity universal joints 38. A pair of rear drive shafts 40 (shown only on one side) having Rzeppa types of single, constant velocity universal joints 42 at their ends, distribute the power to the rear wheels 18'.

The rear differential 36 is of the limited-slip type capable of transferring torque from one rear wheel to the other when there is a decrease or loss of traction on one side. The rear differential 36 employed in the vehicle is a 1970 Corvette "positraction" differential having a 5:14 to 1:00 ratio. For a description of this differential reference may be made to the 1970 Chassis Overhaul Manual No. ST 131-70 pages 4 - 11 through 4 - 19 and 4 - 26 through 4 - 29 published by the Chevrolet Motor Division, General Motors Corporation, Detroit, Michigan, United States of America.

The interaxle differential 20 as previously mentioned serves to divide the power from the transmission 14 to the front and rear propeller shafts 22 and 24. The interaxle differential further incorporates a limited slip feature similar to the rear differential 36 such that when either the front wheels 18 or rear wheels 18' are subjected to reduced traction or a loss of traction, torque from the transmission is directed to the other set of wheels (either front or rear) and is effective when the vehicle is driven either in forward or reverse. Such an interaxle differential is produced by the Warner Gear/Warner-Motive Divisions of the Borg-Warner Corporation. The limited slip interaxle differential 20 is constructed in accordance with the principles of Brownyer U.S. Pat. No. 3,380,593, issued July 2, 1968 which normally drives both output shafts with equal torque

Suspension

Referring now to FIGS. 2 and 3 and particularly to FIG. 3 it can be seen that the frame 10 of the vehicle is of a welded tubular construction. Each of the four driving wheels, mounted to the corners of the frame by independent suspension units are indicated generally at 44. These suspension units are substantially similar except for variations in torsion bar, shock absorber and linkage attachment points due to the units location, i.e., front to rear and side to side.

A typical suspension unit 44 such as the left rear unit is shown in FIG. 3. The unit generally comprises an upper A frame arm 46 and a lower A frame arm 48. These frames are attached to longitudinally extending tubular frame members 50 by means of multiple brackets 52. The inner ends of the A frame arms usually include bonded rubber bushings 54 which receive mounting bolts 56 that secure the A frames to the brackets 52 while permitting vertical swinging motion of the A frames 46 and 48. A steering knuckle 58 is mounted between the outer ends of the A frames at 60 by means of conventional ball mounts best seen in FIG. 4.

The steering knuckle 58 includes a spindle 62 having a bearing mounted wheel hub 64 that has wheel mounting studs 66 and an attached brake disc 68. A brake caliper 70 which extends over the disc is also attached to the knuckle 58 and is effective to brake the wheel when hydraulic pressure is applied. The suspension unit further includes an anti-sway bar 72 that extends transversely across the rear of the frame and is attached thereto by means of rubber bushed mounts 74 (only one being shown). The ends of the sway bar are attached to the lower A frame arms 48 by means of a bolt and rubber cushion connector indicated at 76 in FIG. 3.

The rear suspension unit also includes an adjustable tie rod 78 pivotally attached between the frame 10 and an arm 79 on the steering knuckle 58 by means of ball joint mounts 80. As seen in FIG. 7 the front suspension units also have arms 79 to which a well known Ackerman type steering linkage is attached at 81.

Referring now to FIG. 3, a coil over a tubular double acting shock absorber 82 is pivotally supported on its upper end to a diagonal frame member 83 between a pair of brackets 84. The shock absorber 82 extends downwardly between the wishbone arms of the upper A frame 46. The lower end of the shock absorber is attached to the lower A frame arm 48 by means of a rubber bushed bolted connection 85 best seen in FIG. 4.

Further springing of the suspension unit is provided by a longitudinally extending torsion bar 86. The torsion bar includes a hexagonal end that is received in a projection on the lower A frame 48 as illustrated in FIG. 4. A similar torsion bar 86 extending horizontally of the vehicle is provided for each suspension unit as seen in FIG. 2. The other ends of the torsion bars are adjustably attached to the vehicle frame by means of torsion bar anchors 88. Referring now to FIG. 5, anchors 88 fit over hexagonal ends of the torsion bar. These anchors are longitudinally restrained in box section brackets 90 welded to the frame 10. In order to rotatably restrain the anchors 88 and permit adjustment of the preload on the torsion bars for the purpose of varying the vehicle ground clearance and spring rate, a threaded adjusting bolt 92 passes through a clearance hole in the bracket 90 and through a threaded stop bar 94 to bear against the anchor at 96. To locate the stop bar 94 and prevent its rotation when bolt 92 is turned, an aperture 98 is provided in the bracket through which the stop projects.

Each of the suspension units 44 mounts a 16 inch diameter by 10 inch wide rim 100 (FIG. 2) upon which low pressure tires 102 (15 p.s.i.) preferably size 36 × 12.4 × 16.1 are mounted.

Roll Steering

As a result of the independent suspension having unequal A frame arms 46 and 48 and the tie rods 78 between the steering knuckle 58 and frame, the vehicle and in particular the rear wheels 18' exhibit the characteristics known as roll steering. This characteristic is usually intentionally eliminated in most vehicles including cross-country types by the selection of the suspension geometry. The vehicle of the present invention employs power augmented roll steering to improve cross-country mobility, using the characteristic at the rear wheels to decrease the vehicle turning radius.

The roll steering characteristic and its employment and effect on vehicle turning radius will now be described with reference to FIGS. 6 and 7. As seen in FIG. 6, an end view of the rear of the vehicle, when the frame 10 of vehicle rolls outwardly as indicated by arrow 104 due to a right hand turn, the rear wheels 18' also lean outwardly. This is due to the fact that the center of gravity 106 of the body is above the roll steer center 108, and the fact that the upper A frame arm 46 is shorter than the lower frame arm 48. The present suspension allows a maximum body roll in the order of 8¼° and produces a corresponding outward tilt on each rear wheel in the order of 6°, as seen in FIG. 6.

Referring now to FIG. 7, a diagrammatic plan view of the vehicle making a right hand turn, it can be seen that the rear wheels 18' also turn together toward the outside of the turn approximately 2½° as well as tilting as in FIG. 6. The turning of the rear wheels 18' through the horizontal angle of 2½° is caused by an inward pull on the left rear tie rod 78 and an outward push on the right rear tie rod due to rotation of the vehicle frame 10 about its roll center. This is seen as the motion between the normal tie rod position shown in broken line and the displaced position in solid line shown in FIG. 6.

The outward turning of the rear wheels 18' and the application of power to them through the limited slip interaxle differential 20 produces a power augmented roll steer that in turn reduces the turn radius of the vehicle.

The front wheels 18 exhibit the same roll steer characteristic with the Ackerman type steering linkage 81 taking the place of the tie rods 78 at the rear suspension. Although the roll steer characteristic tends to increase the turning radius of the front wheels, this is easily overcome by turning the steering wheel further.

Operation

In cross-country operation the vehicle is driven as a normal automobile. The four wheel drive power train 16 (FIG. 1) is always in the f four wheel mode, not being selectively engagable as in the Jeep type vehicles. If traction is lost on either of the front wheels 18, no torque will be delivered to the other front wheel since they are driven through the common slip-type front differential 30. Thereafter the entire torque from the transmission 14 is transferred to the rear differential 36 through the limited slip interaxle differential 20. Now if either of the rear wheels loses traction, the entire torque is transferred to the other rear wheel due to the limited slip action of the rear differential 36. Thus it is possible to drive the vehicle having traction at only one of the rear wheels.

In the case of loss of traction at both rear wheels 18' the interaxle differential 20 transfers the torque to the front differential 30 to drive the front wheels 18 until either of them lose traction.

Employing the present four wheel drive train with a fully independent suspension, roll center steering, adjustable torsion bars for varying the vehicle ground clearance as well as suspension spring rate, in a vehicle with a dry weight of 4500 lbs., a wheel base of 114 inches and a track of 62 inches results in an all terrain vehicle capable of safely moving across rough terrain at speeds approximately twice as great as current Jeep type vehicles.

Although the best mode contemplated for carrying out the present invention has been herein shown and described, it will be apparent that modification and variation may be made without departing from what is regarded to be the subject matter of the invention.

I claim:

1. A four wheeled, front wheel steering, all terrain vehicle comprising a frame, an engine and transmission mounted on the frame, means for independently suspending all four wheels, a limited slip differential and articulated axle drive for the rear wheels, a free running differential and articulated axle drive for the front wheels, a limited slip interaxle differential which normally drives each output shaft with equal torque driven by said transmission, and drive shafts running fore and aft and substantially concentrically from said interaxle differential to said wheel differentials.

* * * * *